United States Patent
Cassar et al.

(10) Patent No.: US 8,731,776 B2
(45) Date of Patent: May 20, 2014

(54) MOTOR VEHICLE ELECTRIC POWER ASSISTED STEERING SYSTEM

(75) Inventors: Stephane Cassar, Caluire (FR); Sebastien Herault, Lyons (FR); Jean-Marc Kasbarian, Lyons (FR); Pierre Pilaz, Saint Marcel l'Eclaire (FR); Pascal Moulaire, Roanne (FR)

(73) Assignee: Jtekt Europe (FR)

( * ) Notice: Subject to any disclaimer, the term of this patent is extended or adjusted under 35 U.S.C. 154(b) by 618 days.

(21) Appl. No.: 13/002,931

(22) PCT Filed: Jun. 23, 2009

(86) PCT No.: PCT/FR2009/051195
§ 371 (c)(1),
(2), (4) Date: Jul. 6, 2011

(87) PCT Pub. No.: WO2010/004160
PCT Pub. Date: Jan. 14, 2010

(65) Prior Publication Data
US 2011/0257844 A1    Oct. 20, 2011

(30) Foreign Application Priority Data
Jul. 7, 2008    (FR) .................................... 08 03853

(51) Int. Cl.
*B62D 6/00*      (2006.01)
*B62D 11/00*     (2006.01)
*B62D 12/00*     (2006.01)

(52) U.S. Cl.
USPC ............. 701/41; 180/446; 180/443; 180/444; 74/388

(58) Field of Classification Search
USPC .............. 701/41–42; 180/443–444, 400, 446; 74/388
See application file for complete search history.

(56) References Cited

U.S. PATENT DOCUMENTS 6,450,287 B1 * 9/2002 Kurishige et al. ............. 180/446
6,694,237 B2 * 2/2004 Kifuku et al. .................. 701/41
(Continued)

FOREIGN PATENT DOCUMENTS

DE      4207719 A1 * 9/1993
EP      0262469 A1 * 4/1988
(Continued)

OTHER PUBLICATIONS

The Japanese Office Action of corresponding Japanese Application No. 2006-199451, dated Jul. 14, 2011 and mailed Jul. 19, 2011.*

(Continued)

*Primary Examiner* — Cuong H Nguyen
(74) *Attorney, Agent, or Firm* — Cantor Colburn LLP

(57) ABSTRACT

The processing means, which control the power assisted steering motor (8), determine and give consideration to a first steering angle signal (A) determined as a function of the calculation or measurement of the force or torque delivered by the power assisted steering motor (8) and possibly of the steering torque or force applied by the driver to the steering wheel (2), a second steering angle signal (B) determined as a function of the calculation of the measurement of the angular position of the power assisted steering motor (8), a third signal (C) of the "index" type, that is to say of the type emitted for certain angular positions of the steering system (21), a convergence signal (D) indicative of the convergence of the steering angle calculations, and a confirmation signal (E) confirming the calculation of the steering angle, the convergence signal (D) being produced thanks to the signal (C) of "index" type to indicate a confidence level on the estimated steering angle value. The invention can be applied to vehicles that have an automated steering function.

3 Claims, 2 Drawing Sheets

(56) References Cited

U.S. PATENT DOCUMENTS

| | | | |
|---|---|---|---|
| 8,200,392 B2 * | 6/2012 | Kodaira et al. | 701/41 |
| 8,321,090 B2 * | 11/2012 | Sakuma | 701/41 |
| 2003/0045981 A1 * | 3/2003 | Kifuku et al. | 701/41 |
| 2008/0021612 A1 * | 1/2008 | Sakuma | 701/41 |
| 2008/0217099 A1 * | 9/2008 | Reungwetwattana et al. | 180/446 |
| 2009/0125187 A1 * | 5/2009 | Yamamoto et al. | 701/42 |
| 2009/0240389 A1 * | 9/2009 | Nomura et al. | 701/29 |
| 2009/0271069 A1 * | 10/2009 | Yamamoto et al. | 701/41 |
| 2009/0319125 A1 * | 12/2009 | Lavoie | 701/41 |
| 2010/0133035 A1 * | 6/2010 | Lunden et al. | 180/443 |
| 2010/0161178 A1 * | 6/2010 | Kodaira et al. | 701/41 |
| 2010/0299027 A1 * | 11/2010 | Aoki | 701/42 |
| 2011/0257844 A1 * | 10/2011 | Cassar et al. | 701/41 |
| 2013/0066501 A1 * | 3/2013 | Oyama et al. | 701/22 |
| 2013/0253773 A1 * | 9/2013 | Itamoto et al. | 701/43 |

FOREIGN PATENT DOCUMENTS

| | | | |
|---|---|---|---|
| EP | 0556870 A1 * | 8/1993 | |
| EP | 0841238 A2 * | 5/1998 | |
| EP | 1020344 A1 * | 7/2000 | |
| EP | 1550839 | 7/2005 | |
| EP | 1627799 | 2/2006 | |
| EP | 1944221 A1 * | 6/2008 | |
| JP | 2001-261900 * | 8/2001 | |
| JP | 2006-199451 * | 7/2006 | |
| WO | WO 2007/129750 * | 11/2007 | |

OTHER PUBLICATIONS

An opto-electronic 18 b/revolution absolute angle and torque sensor for automotive steering applications; Mortara, A. ; Heim, P. ; Masa, P. ; Franzi, E. ; Ruedi, P.-F. ; Heitger, F. ; Baxter, J.; Solid-State Circuits Conference, 2000. Digest of Technical Papers. ISSCC. 2000 IEEE International; Digital Object Identifier: 10.1109/ISSCC.2000. 839740.*

Optical phased array technology; McManamon, P.F. ; Dorschner, T.A. ; Corkum, D.L. ; Friedman, L.J. ; Hobbs, D.S. ; Holz, M. ; Liberman, S. ; Nguyen, H.Q. ; Resler, D.P. ; Sharp, R.C. ; Watson, E.A.; Proceedings of the IEEE; vol. 84 , Issue: 2 Digital Object Identifier: 10.1109/5.482231; Publication Year: 1996 , pp. 268-298.*

Emergency driving support algorithm with steering torque overlay and differential braking; Jaewoong Choi ; Kyuwon Kim ; Kyongsu Yi; Intelligent Transportation Systems (ITSC), 2011 14th International IEEE Conference on; Digital Object Identifier: 10.1109/ITSC. 2011.6083120; Publication Year: 2011 , pp. 1433-1439.*

International Search Report; PCT/FR2009/051195; Dec. 21, 2009.

* cited by examiner

US 8,731,776 B2

MOTOR VEHICLE ELECTRIC POWER ASSISTED STEERING SYSTEM

FIELD

The present disclosure relates to a motor vehicle power assisted steering system, and more particularly to an electric power assisted steering system, comprising an electric assistance motor and electronic processing means for controlling the electric assistance motor, in particular as a function of electric signals coming from sensors.

In this context, the disclosure relates more specifically to the taking into account of signals which help to determine the steering angle, in particular in the instant following start-up of a previously stopped motor vehicle.

BACKGROUND

FIG. 1 of the appended schematic drawing recalls the main elements which usually constitute an electric power assisted steering system of a vehicle. Such a steering system comprises, on the one hand, a mechanical part comprising a steering wheel 2 connected in rotation to a steering column 3, the end of which remote from the steering wheel 2 carries a steering pinion meshing with a rack 4, mounted slidably in a steering casing 5. The two opposite ends of the rack 4 are respectively connected, via link rods 6 and 7, to the right and left steering wheels (not shown) of the vehicle. The steering system comprises, for assisting the manual force exerted by the driver of the vehicle on the steering wheel 2, an electric assistance motor 8 with two directions of rotation. The output shaft of the electric motor 8 is coupled, via a speed reducer 9 in particular comprising a worm and a tangent wheel or comprising a gear train, to the steering column 3 or to the steering pinion or to the rack 4 directly, so as to transmit a motor torque (optionally also a resisting torque) to the steering system. The electric assistance motor 8 is controlled by an on-board electronic computer 10 which receives and processes various electric signals coming from sensors.

In a customary embodiment, the electronic computer 10 receives in particular an electric signal coming from a torque sensor 11 placed on the steering column 3, and thus measuring the torque exerted by the driver on the steering wheel 2, and also an electric signal coming from a speed sensor 12 of the vehicle.

Based on these various items of information, the electronic computer 10 controls the electric assistance motor 8 by defining at any time an assistance torque or force which may amplify or on the contrary compensate the force applied by the driver on the steering wheel 2, according to predefined "assistance laws".

It should be noted that some steering systems calculate or measure the instantaneous position of the electric assistance motor 8.

It should also be noted that some motor vehicles are equipped with a steering angle sensor which may be integrated in the steering system, or else placed on the steering column for example. The particular feature of such sensors is their ability to supply absolute angle information which is available as soon as the car starts up. The installation of these sensors is nevertheless penalising in terms of weight, volume and cost.

In order to reduce the disadvantages of these sensors in terms of weight, volume and cost, some current steering systems are equipped with simplified sensors which give a point or "top" signal for certain angular positions of the steering system, in particular upon each revolution of the steering pinion. Such sensors are also sometimes denoted as "index" sensors.

By way of illustration of this prior art, reference is made to the patent document EP 1550839 A1.

It should also be noted that some steering systems have to offer automated steering functions, such as the automatic parking function, or automated steering angle limitation for example. These functions need to know the steering angle in order to operate. Moreover, these functions must be active when the vehicle is at a standstill, in the instant following start-up of the vehicle. At present, steering systems equipped simply with sensors of the "index" type cannot be provided with automated steering functions that are active at a standstill in the instant following start-up of the vehicle, even when the system uses an electric assistance motor, the instantaneous position of which is calculated or measured.

BRIEF SUMMARY

Confronted with this situation, the present disclosure aims to enable automated steering functions on a motor vehicle with electric power assisted steering equipped with a simple sensor of "index" type, and it aims more particularly to allow the exploitation of the signal coming from such a sensor in the instant following start-up of the vehicle, when these automatic functions take place or as soon as the driver steers, particularly when the steering system uses an electric assistance motor, the instantaneous position of which is calculated or measured.

To this end, the present disclosure relates to a motor vehicle electric power assisted steering system, the system comprising:
- a sensor for measuring the steering torque exerted by the driver of the vehicle,
- an electric assistance motor provided for assisting the manual force exerted by the driver of the vehicle on the steering wheel and/or for carrying out automated steering manoeuvres,
- means for calculating or measuring the assistance torque delivered by the electric assistance motor,
- means for calculating or measuring the angular position of the electric assistance motor,
- a sensor, known as an "index" sensor, giving a point signal for certain angular positions of the steering system,
- processing means for controlling the electric assistance motor as a function of the signals coming from the sensors and/or other aforementioned means, this electric power assisted steering system being essentially characterised in that the processing means comprise means for determining and taking into account:
- a first steering angle signal determined as a function of the calculation or measurement of the assistance force or torque delivered by the electric assistance motor and optionally of the steering force or torque exerted by the driver on the steering wheel,
- a second steering angle signal determined as a function of the calculation or measurement of the angular position of the electric assistance motor,
- a third signal of "index" type, that is to say emitted for certain angular positions of the steering system,
- a convergence signal for the convergence of the steering angle calculations, and
- a confirmation signal for confirming the calculation of the steering angle, the convergence signal being produced by virtue of the signal of "index" type so as to indicate a level of confidence regarding the estimate of the steering angle.

Thus, a first steering angle signal is determined as a function of the measurement or calculation of the assistance torque (or assistance force) exerted by the electric assistance motor, optionally also taking account of the torque (or force) exerted by the driver on the steering wheel. A second steering angle signal is determined as a function of the signal for measuring the position of the electric assistance motor. By virtue of the signal of "index" type, a convergence signal for the convergence of the steering angle calculations is produced, either by identifying the measurement conditions of the first steering angle signal and/or of the second steering angle signal or by identifying, using a pre-established fixed or dynamically variable model, the first and/or second steering angle signal. The precise steering angle is then finally calculated, as a function of the calculation or measurement of the angular position of the electric assistance motor and of the convergence signal.

The disclosure will be better understood with the aid of the following description, with reference to the appended schematic drawing which shows, by way of example, one embodiment of this motor vehicle electric power assisted steering system.

DETAILED DESCRIPTION

Figure 1:
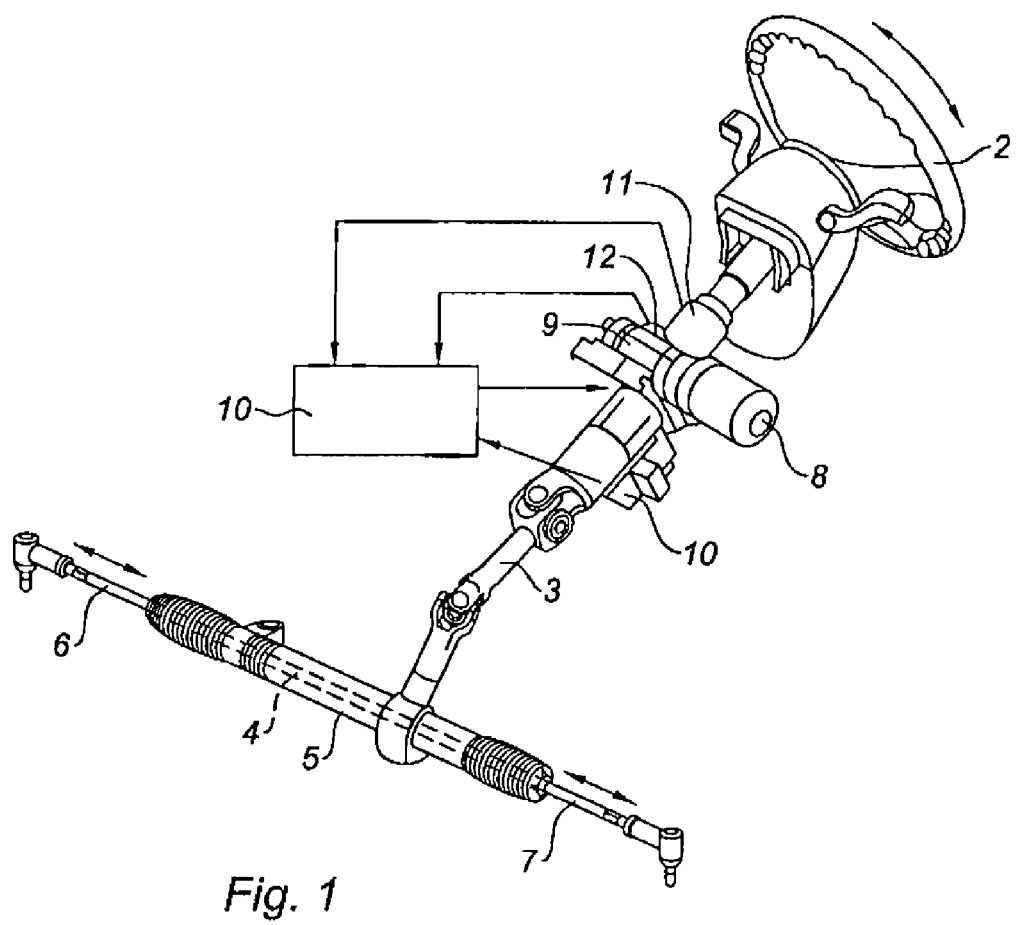
FIG. 1 (already mentioned) is a schematic perspective view of an electric power assisted steering system.
Figure 2:
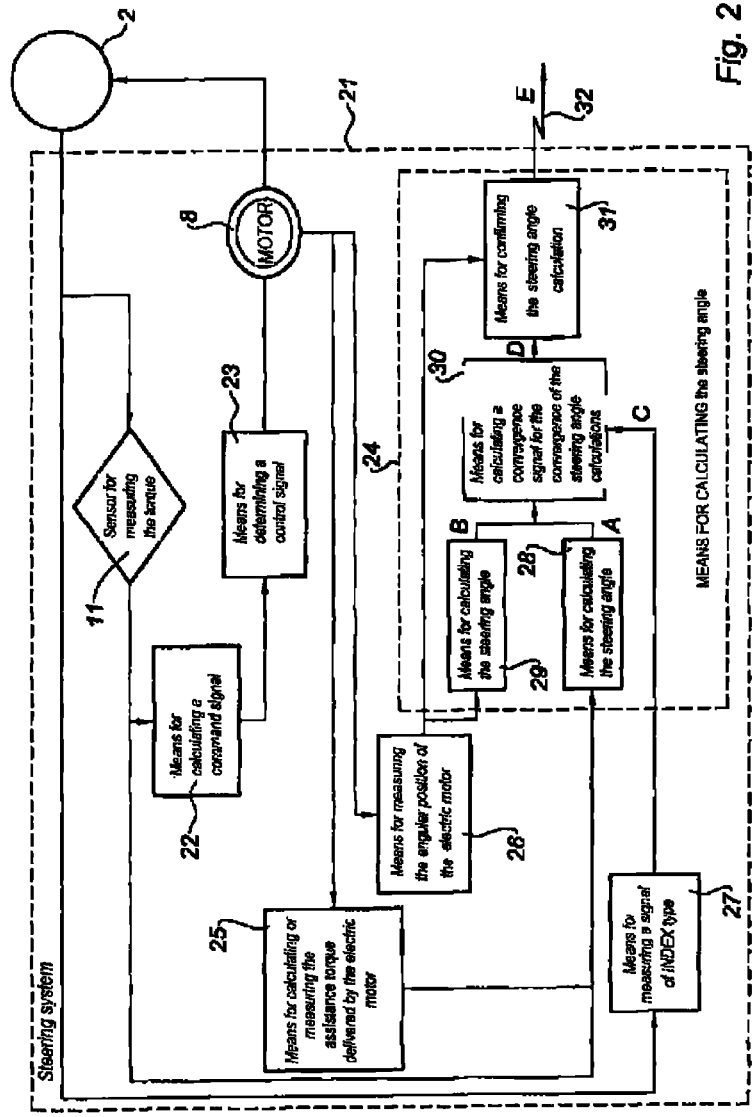
FIG. 2 shows, in the form of a block diagram, the means for processing and in particular calculating the steering angle of the steering system that forms the subject matter of the disclosure.

FIG. 1 recalls the general structure of an electric power assisted steering system, taking by way of example a steering system in which the electric assistance motor 8 is coupled to the steering column 3 via a speed reducer 9. This power assisted steering system is also symbolised in FIG. 2, which indicates at 21 (by a rectangular box in dashed line) the whole of this steering system, including the electric assistance motor 8. The steering wheel 2 is shown schematically, outside the box 21.

A torque sensor 11 measures the speed exerted by the driver on the steering wheel 2. The signal supplied by the torque sensor 11 is delivered to means 22 for calculating a command signal, which is sent to a means 23 for determining a control signal which is itself directed towards the electric assistance motor 8 (this to recall, in a simplified manner, the principle of an electric power assisted steering system).

The electric power assisted steering system 21 also comprises other measurement or calculation means, the signals of which are exploited here in specific means 24 for calculating the steering angle, namely:
- a means 25 for calculating or measuring the assistance torque delivered by the electric assistance motor 8;
- a means 26 for calculating or measuring the angular position of the electric assistance motor 8;
- a sensor 27 connected to the steering column and supplying a signal of "index" type, for example upon each revolution of the steering pinion.

These means deliver various signals, all directed towards the means 24 for calculating the steering angle.

In particular, based on the signal supplied by the means 25 for calculating or measuring the assistance torque delivered by the electric assistance motor 8 and also on the basis of the signal supplied by the sensor 11 for sensing the torque exerted by the driver on the steering wheel 2, a calculation means 28 delivers a first steering angle signal A.

In parallel, on the basis of the signal supplied by the means 26 for calculating or measuring the angular position of the electric assistance motor 8, a calculation means 29 delivers a second steering angle signal B.

The signals A and B are sent to a means 30 for calculating a convergence signal D for the convergence of the steering angle calculations, the calculation means 30 also receiving the signal C coming from the sensor 27, that is to say the aforementioned signal of "index" type.

The output of the means 30 for calculating a convergence signal D is connected to an input of a means 31 for confirming the calculation of the steering angle, which also receives the signal B coming from the means 26 for calculating or measuring the angular position of the electric motor 8 and which delivers a confirmation signal E. Finally, the output 32 of the confirmation means 31 is connected to the envisaged application.

In particular, by virtue of the sensor 27 of "index" type, the system provides, in the instant following start-up of the vehicle, reliable information which can be exploited by an automated steering function.

It will be noted that the taking into account of the steering force or torque exerted by the driver remains optional and that the determination of the convergence signal can be carried out in various other ways; furthermore, the disclosure remains applicable regardless of the point of action of the electric assistance motor, which may be on the steering column or on the steering pinion or on the rack.

The invention claimed is:

1. A method for controlling an electric assistance motor in a motor vehicle electric power assisted steering system, the method comprising:
   measuring the steering torque exerted by the driver of the vehicle,
   calculating or measuring the assistance torque delivered by the electric assistance motor,
   calculating or measuring the angular position of the electric assistance motor,
   providing a point signal from a sensor, known as an "index" sensor, for certain angular positions of the steering system,
   determining a first steering angle signal as a function of the calculated or measured assistance force or torque delivered by the electric assistance motor and optionally of the measured steering force or torque exerted by the driver on the steering wheel,
   determining a second steering angle signal as a function of the calculated or measured angular position of the electric assistance motor,
   determining a third signal of "index" type, that is to say emitted for certain angular positions of the steering system,
   determining a convergence signal for the convergence of the steering angle calculations, and
   determining a confirmation signal for confirming the calculation of the steering angle,
   wherein the convergence signal is produced by the third signal to indicate a level of confidence regarding the estimate of the steering angle.

2. The method according to claim 1, wherein the convergence signal for the convergence of the steering angle calculations is produced by identifying the measurement conditions of the first steering angle signal and/or of the second steering angle signal.

3. The method according to claim 1, wherein the convergence signal for the convergence of the steering angle calculations is produced by identifying, using a pre-established fixed or dynamically variable model, the first steering angle signal and/or the second steering angle signal.

\* \* \* \* \*